Dec. 25, 1956  M. L. GREEN  2,775,523
DECORATIVE HOUSE
Filed Feb. 16, 1953  2 Sheets-Sheet 1

INVENTOR.
MADELYNE L. GREEN
BY Joshua R. H. Potts
HER ATTORNEY.

Dec. 25, 1956  M. L. GREEN  2,775,523
DECORATIVE HOUSE
Filed Feb. 16, 1953  2 Sheets-Sheet 2
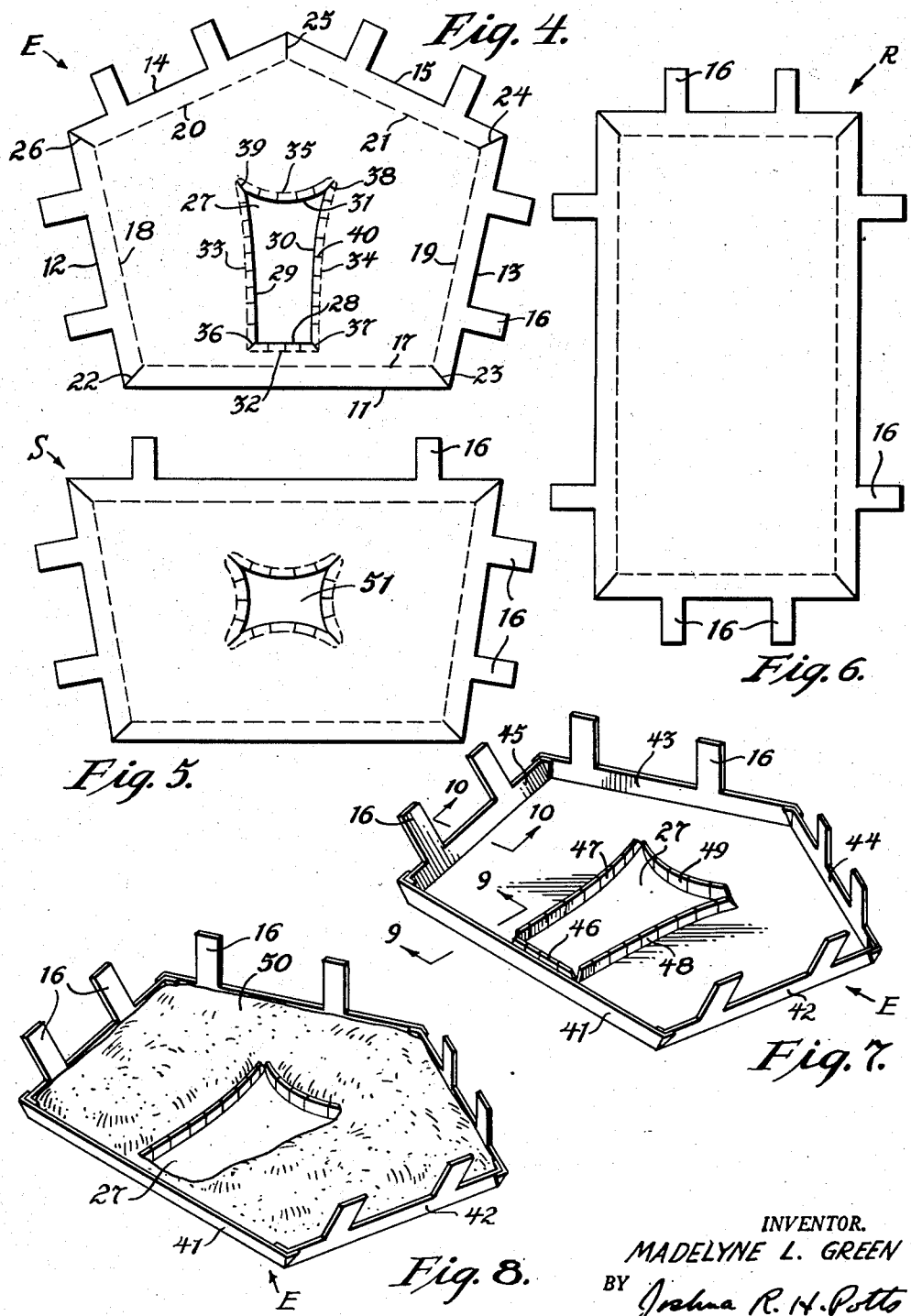
INVENTOR.
MADELYNE L. GREEN
BY Joshua R. H. Potts
HER ATTORNEY.

United States Patent Office 2,775,523
Patented Dec. 25, 1956

2,775,523
DECORATIVE HOUSE

Madelyne Larson Green, Mount Prospect, Ill.

Application February 16, 1953, Serial No. 337,110

4 Claims. (Cl. 99—86)

The present invention relates to decorative houses and is concerned primarily with a novel wall structure and means of assembling such walls into the final house construction.

At the present time decorative houses of the type with which this invention is concerned find varied uses. Such houses are placed under the Christmas tree during the holiday season and are also employed at other times such as Easter, at weddings, birthday parties and similar occasions. Moreover they are often used by children as toys and for instructional purposes.

It is now the conventional practice to make decorative houses of this type of some permanent material such as plastic, sheet metal, wood or cardboard or to make them of an edible substance such as cookies. The present invention is founded on the belief that a decorative house that includes all the desired attributes of a permanent structure together with the desired qualities of an edible house will prove highly acceptable to the public.

With the foregoing conditions in mind the present invention has in view as its foremost objective the provision of a decorative house of the character indicated which includes a plurality of wall and roof elements each of which comprise a pan-like member that is made of a permanent material and which carries either an edible substance or an artificial mixture in semblance thereof.

More in detail the invention has as an objective the provision of a toy house which includes a wall or roof element consisting of a shallow pan which receives a pastry dough such as gingerbread, cake or a cookie dough mix; a candy mixture or an artificial composition such as clay or plaster and which is susceptible of being hardened or finished by baking operation. This wall or roof element is provided with means for assembling it with other similar elements in the house structure.

Another object of the invention is to provide, in a decorative house of the character indicated, a wall or roof element which includes a shallow pan that is made from a thin metal, metal foil or similar permanent material and which pan has wall flanges from which outstand tabs that are used in securing that element to other similar elements.

Yet another object of the invention is to provide in a toy house of the type noted a plurality of wall and roof elements of the character above described that are formed with mitred edges at appropriate locations to facilitate the assembly of the several wall and roof elements.

After the wall and roof elements have been assembled in the manner intended to provide the house structure there will be seams or cracks at the meeting edges. Another important object of the invention is to provide a house of the character indicated in which these cracks or seams are covered by frosting or similar composition.

Various other more detailed objects and advantages of the invention such as arise in connection with carrying out the above noted ideas in a practical embodiment will in part become apparent and in part be hereinafter stated as the description of the invention proceeds.

The invention therefore comprises a decorative house which consists essentially of a plurality of wall and roof elements each of which consists of a shallow pan-like member of a permanent material and which receives an edible substance or a composition in semblance thereof together with means for assembling each wall or roof element with other wall or roof elements and with the seams at the meeting edges covered by frosting or similar material.

For a full and more complete understanding of the invention reference may be had to the following description and accompanying drawings wherein:

Figure 4 is a plan view of one of the wall blanks prior to the folding up of the flanges into the pan-like structure.

Figure 5 is a similar plan view of another of the blanks from which a pan for a wall is formed.

Figure 6 is still another plan view of a blank for one of the roof pans.

Figure 7 is a perspective view showing the pan of Figure 4 with the flanges folded up to define the pan.

Figure 8 is still another perspective showing the pan of Figure 7 as filled with a pastry dough or similar composition.

Figure 1:
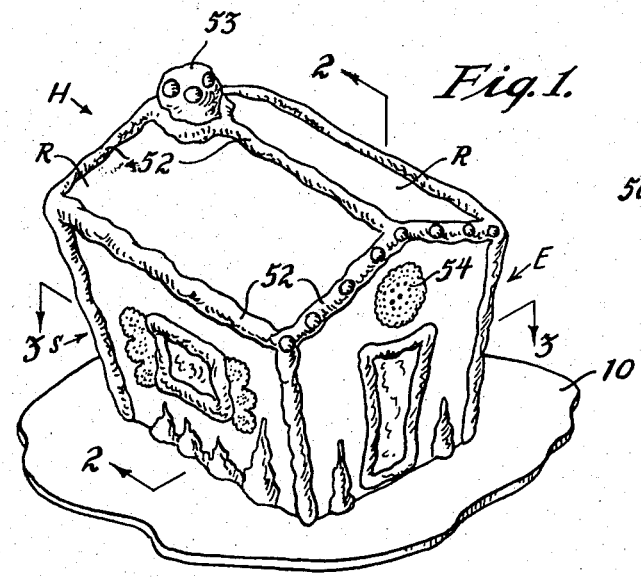
Figure 1 is a perspective view of a decorative house that is constructed in accordance with the precepts of this invention.
Figure 2:
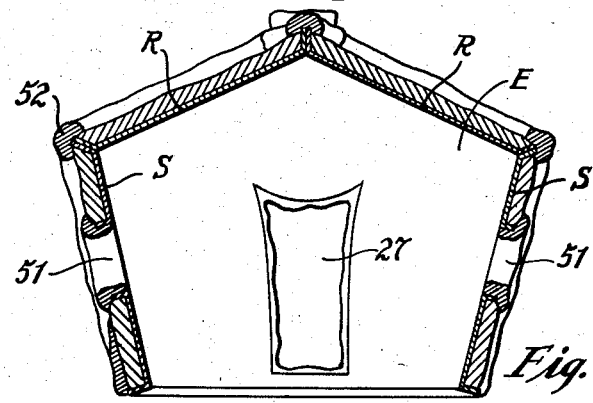
Figure 2 is a vertical section through the house taken about on the plane represented by the line 2—2 of Figure 1.
Figure 3:
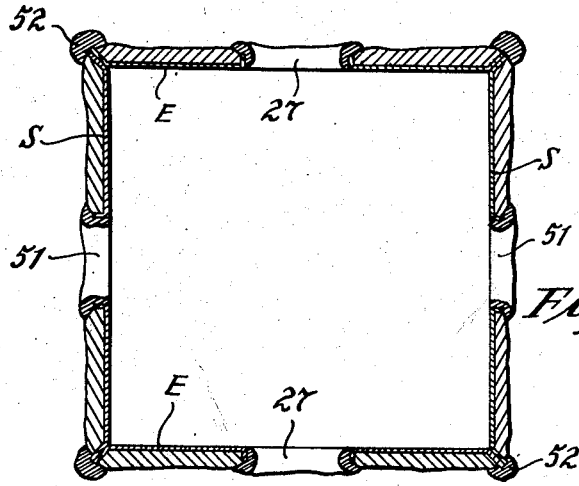
Figure 3 is a horizontal section through the house taken about on the plane represented by the line 3—3 of Figure 1.

Referring now to the drawings wherein like reference characters denote coresponding parts and first more particularly to Figure 1 a decorative house of the type with which this invention is concerned is therein illustrated. This toy house is illustrative of one design which it is believed has a particular appeal. However it is to be clearly understood that this design is not a limitation on the invention as it may be changed or altered within wide limits without departing from the spirit of the invention.

The house is referred to in its entirety by the reference character H and is shown as being mounted on a supporting base 10 which may be of just about any material desired. The house H comprises two end walls E which are substantial duplicates, two side walls S which also are identical and two roof members R which are alike. Referring now more particularly to Figures 4, 7 and 8 the construction and method of constructing the end walls E will be described. To form the end wall E a blank such as illustrated in Figure 4 is taken as the starting point. This blank may be of any material of a permanent nature that is susceptible of being cut and folded into the pan-like structure illustrated in Figure 7. Purely by way of illustration a heavy metal foil may be taken as the preferred embodiment. This blank is defined by a bottom edge 11, two inclined side edges 12 and 13, and two top edges 14 and 15.

Outstanding from each of the side edges 12 and 13, and each of the top edges 14 and 15 are a pair of spaced tabs 16 all of which are substantially alike.

The blank is scored along the line 17 that is spaced inwardly from and parallel to the bottom edge 11. It is also scored along a line 18 that is spaced inwardly from and parallel to the side edge 12. Likewise it is scored along a line 19 that is spaced inwardly from and parallel to the side edge 13. In a similar manner score lines 20 and 21 are formed in spaced parallel relation with respect to the top edges 14 and 15 respectively.

At each corner of the blank the material thereof is cut from the meeting of the score lines outwardly to the respective corner. These cuts are represented at 22, 23, 24, 25 and 26.

Inasmuch as the end wall E is intended to include a door an opening for this door is represented at 27. The opening at 27 is defined by a bottom edge 28, side edges 29 and 30 and a downwardly bowed top edge 31. There is a score line that is inwardly spaced and parallel to each of these door edges. These score lines are represented at 32, 33, 34 and 35. At each corner there is a cut that extends from the meeting of the respective score lines outwardly to the corners. These cuts are represented at 36, 37, 38 and 39.

Inasmuch as the door edges are not straight lines additional cuts as indicated at 40 are formed in the several flanges defined by the edges and score lines.

Referring now more particularly to Figure 7, the blank is shown as folded along the score line 17 to provide a bottom flange 41. Likewise the side edge 13 is folded up to provide a side flange 42. Similarly the blank is folded along the top score lines 20 and 21 to provide top flanges 43 and 44, and along the score line 18 to provide another side flange 45.

It will be noted that the cuts at 22, 23, 24, 25 and 26 accommodate this formation of the flanges 41, 42, 43, 44 and 45. It is also important to note that the bottom flange 41 and top flanges 43 and 44 are substantially normal to the main body of the blank, that is they are disposed at substantially 90° relative thereto. In contrast to this the side flanges 42 and 45 are disposed at an angle of 45° with respect to the body of the blank.

The door opening 27 is now finished by folding along the scorings 32, 33, 34 and 35 which operation is accommodated by the cuts 36, 37, 38 and 39 at the corners and also by the intermediate cut 40 to form the bottom door flange 46, side door flanges 47 and 48 and top door flange 49. This completes the pan-like structure which it will be noted includes folded over edges at each of the corners as illustrated in Figure 7.

An appropriate pastry mixture such as gingerbread, cake, bread or cookie dough is now filled into the pan. This mixture is represented at 50 in Figure 8. As an alternative an artificial mixture such as clay or plaster may be employed or it might be desirable to use a candy mixture. In any event after the pan has been filled to substantially the level of the flanges it is subjected to a baking operation to harden or set the mixture 50. This completes the manufacture of the individual end walls E.

The side walls S are formed from blanks one of which is illustrated in Figure 5 and which blank includes the same essential structural characteristics which identify the blanks from which the walls E are formed with the exception that as the side walls S are four-sided the blank is also four-sided. It is deemed unnecessary to here repeat a detailed description of each of the edges, scorings and cuts which enter into the formation of a blank for the wall S. It is sufficient to point out that each of these blanks for the side walls S is formed with the window opening 51 in exactly the same manner as is the door opening 27 formed with the blank for an end wall.

The blank for one of the roof elements is represented in Figure 6. This blank also has the usual edges which mark off its rectangular formation as well as the scorings and cuts at the corners and the outward extending tabs 16. Like the end walls E and the side walls S the blank of Figure 6 is first folded into a pan-like structure, filled with a composition 50, and then subjected to heat to set or harden the composition.

Figure 11:
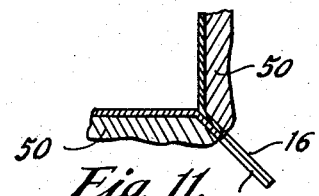
Figure 11 is a detailed sectional view depicting the first step in securing two of the tabs together.
Figure 12:
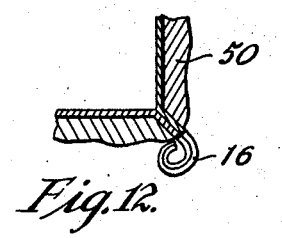
Figure 12 is a similar detailed sectional view illustrating the next step in the securing of a pair of the tabs together.
Figure 13:
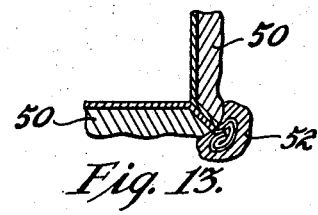
Figure 13 is a view similar to Figures 11 and 12 showing the final step by which the joined tabs are covered by the frosting.
Figure 9:
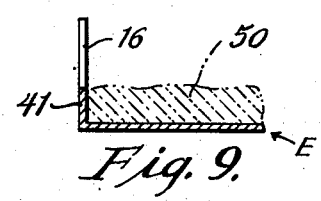
Figure 9 is a detailed sectional view taken about on the plane represented by the line 9—9 of Figure 7.
Figure 10:
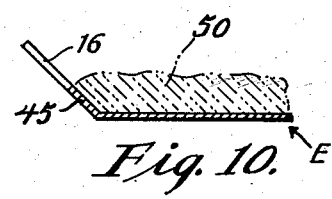
Figure 10 is a detailed sectional view taken about on the plane represented by the line 10—10 of Figure 7.

The end walls E, side walls S and roof members R are now assembled into the house construction illustrated in Figure 1. When the various wall and roof elements are first brought together the tabs 16 on one element will come into meeting face to face engagement with the tabs on an adjacent element. This is illustrated in Figure 11. These tabs are now bent or curled over into the construction illustrated in Figure 12. This secures the assemblage. Obviously there is a crack or seam at each place where the edges meet. This crack is covered by frosting or appropriate composition such as represented at 52. This frosting may be of an appropriate color which will have a desired relation with respect to the color of the composition 50. Thus as a general rule it may be stated that the frosting at the seams will be of a color that is in contrast to the color of the composition 50 so that it stands out. The edges of each of the doors and windows may also be lined by the frosting 52 as illustrated in Figure 1 and if desired the door opening 27 and window openings 51 may be filled in with an appropriate material. Other decorative features such as the chimney represented at 53 and the decoration at 54 may also be added, using a frosting of an appropriate color.

While the invention has been illustrated and described as embodied in a decorative or toy house it will be understood that it is not limited to structures of this particular character. The invention is equally susceptible of embodiment in structures similating garages, churches, railway stations, and complete buildings. Moreover, such structures may be in the nature of displays rather than toys.

While a preferred specific embodiment of the invention is herein set forth it is to be clearly understood that the invention is not to be limited to the exact materials, designs and constructions illustrated and described because various modifications of these details may be provided in putting the invention into practice within the purview of the appended claims.

What is claimed is:

1. A decorative house comprising a pair of end wall elements each having a door opening, a pair of side wall elements each having a window opening and a pair of roof elements, each of said elements comprising a member of metal foil defining a recess filled with an edible composition adhered to the inner surfaces thereof and having outwardly extending tabs that are secured to corresponding tabs of another element, the edges of each of said door and window openings and the meeting edges of said elements being covered by a frosting.

2. A decorative house comprising a plurality of wall and roof elements, each of said elements defining a recess and being formed of metal foil, a comestible disposed in each of said recesses and adhered to the walls of the elements, and locking means secured to each of said elements and movable into interlocking engagement with each other to secure the individual elements together in an assembled relationship to form a house.

3. A decorative house comprising a plurality of metal foil wall and roof elements, each of said elements having a plurality of flanged portions at the edges thereof forming a recess, spaced tabs carried on said elements, said plurality of elements being arranged in juxtaposition and held therein by said tabs to form a house, and a mass of comestible material disposed in each of said recesses and adhered to said elements.

4. The decorative house set forth in claim 3 in which the lines of engagement between juxtaposed elements define seams and in which a mass of comestible material is provided covering said seams.

References Cited in the file of this patent

UNITED STATES PATENTS

| | | |
|---|---|---|
| 181,215 | Sloat | Aug. 15, 1876 |
| 356,522 | Buckingham | Jan. 25, 1887 |
| 1,193,975 | Beardsley | Aug. 8, 1916 |
| 1,630,117 | Faulkner | May 24, 1927 |
| 1,662,100 | Blum | Mar. 13, 1928 |
| 1,692,346 | Nitschke et al. | Nov. 20, 1928 |
| 2,061,510 | Drumpelmann | Nov. 17, 1936 |
| 2,421,112 | Brooks | May 27, 1947 |

FOREIGN PATENTS

| | | |
|---|---|---|
| 18,785 | Great Britain | 1905 |